(12) United States Patent
Sundaresan et al.

(10) Patent No.: US 9,967,860 B2
(45) Date of Patent: May 8, 2018

(54) EFFICIENT NETWORK-WIDE BROADCASTING OVER LTE NETWORKS

(71) Applicant: NEC Laboratories America, Inc., Princeton, NJ (US)

(72) Inventors: Karthikeyan Sundaresan, Howell, NJ (US); Mustafa Arslan, Princeton, NJ (US); Rajarajan Sivaraj, Plainsboro, NJ (US)

(73) Assignee: NEC Corporation (JP)

( * ) Notice: Subject to any disclaimer, the term of this patent is extended or adjusted under 35 U.S.C. 154(b) by 97 days.

(21) Appl. No.: 15/066,340

(22) Filed: Mar. 10, 2016

(65) Prior Publication Data

US 2016/0270031 A1    Sep. 15, 2016

Related U.S. Application Data

(60) Provisional application No. 62/131,475, filed on Mar. 11, 2015.

(51) Int. Cl.
*H04W 72/00*    (2009.01)
*H04W 28/02*    (2009.01)
(Continued)

(52) U.S. Cl.
CPC ..... *H04W 72/005* (2013.01); *H04W 28/0236* (2013.01); *H04B 7/024* (2013.01); *H04W 72/082* (2013.01)

(58) Field of Classification Search
None
See application file for complete search history.

(56) References Cited

U.S. PATENT DOCUMENTS

| 2011/0007668 A1 | 1/2011 | Shang et al. |
| 2014/0126454 A1* | 5/2014 | Zhang ............... H04W 4/06 370/312 |

(Continued)

OTHER PUBLICATIONS

Chen et al., "Fair and Optimal Resource Allocation for LTE Multicast (eMBMS): Group Partitioning and Dynamics", IEEE Conference on Computer Communications (INFOCOM), May 2015 pp. 1266-1274.

(Continued)

*Primary Examiner* — Brian Roberts
(74) *Attorney, Agent, or Firm* — Joseph Kolodka (57) ABSTRACT

A system and method for network-wide broadcasting, including identifying interference dependencies between base stations (eNBs) to generate one or more single frequency network (SFN) clusters for one or more broadcast sessions. The generating of SFN clusters includes performing a controlled decrease in transmit diversity gain for each of the sessions by progressively creating smaller SFN clusters, iteratively creating the smaller SFN clusters until a target modulation and coding scheme (MCS) threshold is met to generate a plurality of SFN clusters, and selecting an SFN cluster with a maximum common MCS for all SFN clusters in a set. Resource block (RB) allocation is integrated with the generating of the SFN clusters to determine maximum system utility, and the system utility considers the sum of the utilities of broadcast and unicast flows. Network-wide broadcasting is controlled based on the determined maximum system utility.

13 Claims, 7 Drawing Sheets

(51) Int. Cl.
  *H04B 7/024* (2017.01)
  *H04W 72/08* (2009.01)

(56) References Cited

U.S. PATENT DOCUMENTS

2014/0169255 A1* 6/2014 Zhang ................. H04W 72/005
                                                      370/312
2014/0192697 A1* 7/2014 Anchan ............... H04W 72/005
                                                      370/312

OTHER PUBLICATIONS

Saran, et al., "Finding k-cuts Within Twice the Optimal", IEEE, Foundations of Computer Science, Oct. 1991, pp. 743-751.
Sundaresan, et al., "Cooperation Versus Multiplexing: Multicast Scheduling Algorithms for OFDMA Relay Networks", IEEE/ACM Ttransactions on Nwetowrking, Jun. 2014, pp. 756-769, vol. 22, No. 3.

* cited by examiner

EFFICIENT NETWORK-WIDE BROADCASTING OVER LTE NETWORKS

RELATED APPLICATION INFORMATION

This application claims priority to provisional application Ser. No. 62/131,475, filed on Mar. 11, 2015, incorporated herein by reference.

BACKGROUND

Technical Field

The present invention relates to network-wide broadcasting, and more particularly, to a multi-cell broadcasting framework for maximizing system utility of broadcast and unicast flows for network-wide broadcasting over Long Term Evolution (LTE).

Description of the Related Art

Evolved-Multimedia Broadcast Multicast Services (eM-BMS) is a set of features in Long Term Evolution (LTE) networks to deliver bandwidth-intensive multimedia content on a point-to-multipoint basis. The notion of a Single Frequency Network (SFN) in eMBMS allows base stations to synchronize and transmit signals in a coordinated fashion. While SFN boosts users' channel quality via transmit diversity, the use of a common modulation scheme for broadcast content across base stations, results in reduced utilization for those that can support much higher data rates for their users. Excluding such base stations from the SFN helps them utilize their resources better by not being constrained by the common modulation, but creates additional inter-cell interference from their independent transmissions.

3GPP LTE is the latest wireless broadband standard that offers higher data rates than its predecessors. However, existing LTE deployments are not primed to carry high bandwidth broadcast content (e.g., HD live news) addressed to a large audience. Recent standardization efforts behind evolved Multimedia Broadcast Multicast Services (eM-BMS) support the delivery of broadcast sessions to a practically unlimited number of users over a wide geographical area. The envisioned use cases of eMBMS include live television, enhancing the fan experience at venues via live video (replays with multiple camera angles etc.), delivering over-the-air software updates to mobile devices and emergency broadcast messages.

SUMMARY

A method for network-wide broadcasting, including identifying interference dependencies between base stations (eNBs) to generate one or more single frequency network (SFN) clusters for one or more broadcast sessions. The generating of SFN clusters includes performing a controlled decrease in transmit diversity gain for each of the sessions by progressively creating smaller SFN clusters, iteratively creating the smaller SFN clusters until a target modulation and coding scheme (MCS) threshold is met to generate a plurality of SFN clusters, and selecting an SFN cluster with a maximum common MCS for all SFN clusters in a set. Resource block (RB) allocation is integrated with the generating of the SFN clusters to determine maximum system utility, and the system utility considers the sum of the utilities of broadcast and unicast flows. Network-wide broadcasting is controlled based on the determined maximum system utility.

A system for network-wide broadcasting, including a cluster generator configured to identify interference dependencies between base stations (eNBs) to generate one or more single frequency network (SFN) clusters for one or more broadcast sessions. The generator is further configured to perform a controlled decrease in transmit diversity gain for each of the sessions by progressively creating smaller SFN clusters, iteratively create the smaller SFN clusters until a target modulation and coding scheme (MCS) threshold is met to generate a plurality of SFN clusters, and select an SFN cluster with a maximum common MCS for all SFN clusters in a set. An integrator is configured to integrate resource block (RB) allocation with the generating of the SFN clusters to determine maximum system utility, and the system utility considers the sum of the utilities of broadcast and unicast flows. A controller is configured to control network-wide broadcasting based on the determined maximum system utility.

A computer readable storage medium comprising a computer readable program for network-wide broadcasting, wherein the computer readable program when executed on a computer causes the computer to perform the steps of identifying interference dependencies between base stations (eNBs) to generate one or more single frequency network (SFN) clusters for one or more broadcast sessions. The generating of SFN clusters includes performing a controlled decrease in transmit diversity gain for each of the sessions by progressively creating smaller SFN clusters, iteratively creating the smaller SFN clusters until a target modulation and coding scheme (MCS) threshold is met to generate a plurality of SFN clusters, and selecting an SFN cluster with a maximum common MCS for all SFN clusters in a set. Resource block (RB) allocation is integrated with the generating of the SFN clusters to determine maximum system utility, and the system utility considers the sum of the utilities of broadcast and unicast flows. Network-wide broadcasting is controlled based on the determined maximum system utility.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for efficient network-wide broadcasting over LTE. In one embodiment, the present principles may be employed to maximize the aggregate system utility of unicast and broadcast flows in each frame in one or more data transmissions/broadcasts.

Striking a balance between SFN cooperation and resource utilization is crucial for efficiently delivering broadcast content as well as other unicast flows in Evolved-Multimedia Broadcast Multicast Services (eMBMS) systems. In some embodiments, the present principles may be employed to addresses this tradeoff to improve overall system throughput significantly (e.g., by more than 40%) as compared with conventional systems and methods.

In one embodiment, eMBMS enables broadcasting of data, which contrasts with the traditional point-to-point (unicast) delivery (e.g., using Long Term Evolution (LTE) networks). It is noted that the terms "broadcast" and "multicast" are used interchangeably throughout this document. In unicast, each LTE base station (called eNodeB or eNB) allocates a different set of transmission resources to each user equipment (UE), encoded with the particular modulation and coding scheme (MCS) supported by the UE's channel. Even if the UEs access exactly the same session, they share the finite resources at the eNB, making unicast inherently limited for high bandwidth applications. On the other hand, eMBMS enables eNBs to allocate one common set of resources, encoded with a common MCS, for all UEs interested in the session. Hence, eMBMS easily scales to a large number of subscribers owing to the point-to-multipoint nature of transmission.

In some embodiments, eMBMS enables a feature called single frequency network (SFN) according to the present principles. An SFN is a group of eNBs, synchronized at the symbol level, to transmit the same broadcast session on a network-wide scale over a common set of radio resources encoded by the same MCS. With this level of tight coordination across eNBs, the otherwise unwanted interference among them becomes constructive and the identical signals combine at the UEs, boosting their average Signal to Interference-plus-Noise Ratio (SINR). This technique is called transmit diversity and is especially useful in dense deployments, where inter-eNB interference adversely impacts performance of cell-edge UEs.

In some embodiments, the present principles may be employed to determine an optimum tradeoff between transmit diversity gain and gains from resource multiplexing. The common MCS for the broadcast session may be selected to be the minimum MCS supported by any subscriber to guarantee delivery to all of them. Grouping eNBs in an SFN may increase the common MCS by boosting the SINR of users with poor channel qualities in some embodiments. However, if some UEs experience an already high SINR (e.g., supporting aggressive modulations) from their eNBs prior to the formation of the SFN, they may not significantly benefit from the transmit diversity. In fact, the common minimum MCS dictated by the SFN may be worse than that supported by such UEs.

In one embodiment, since the SFN binds the eNBs to use the same (minimum) MCS (and the ensuing common allocation), all UEs may experience the same data rate even though some of them could support higher data rates. On the other hand, without SFNs, eNBs do not have the constraint of using the same common MCS and resource allocation. Therefore, some eNBs can leverage the heterogeneity of user channels by using higher MCSs to more efficiently multiplex (or utilize) their resources across different sessions that they are serving. However, the independent operation of such eNBs comes at the cost of additional interference received from (and projected to) other eNBs, since the inter-eNB coordination is lost. Thus, there may be a tradeoff between resource multiplexing (utilization) gain at eNBs and the transmit diversity gain in cooperative SFNs according to various embodiments of the present principles.

Despite standardization for broadcast delivery and synchronized transmission in eMBMS, determining which eNBs should be grouped into an SFN to serve a session is open for innovation and has a large impact on overall performance. As described in detail herein below, the best clustering often lies between full cooperation (where all eNBs are part of one SFN) and fully independent operation (where each eNB is an SFN by itself) according to the present principles. A key is to identify the interference dependencies between eNBs to create localized SFNs that leverage transmit diversity (where needed), and at the same time allow for sufficient MCS decoupling across eNBs for better resource multiplexing according to the present principles.

Currently, mobile network operators (e.g., cellular service providers) are not yet armed with sophisticated tools and deep understanding to offer the best eMBMS service quality to their subscribers. Towards this end, the present principles employ a design framework which includes efficient algorithms/methods to address the tradeoffs and challenges inherent to eMBMS operation. Indeed, the present principles may be employed to provide improvements (e.g., greater than 40%) in aggregate system throughput as compared to conventional systems and methods according to various embodiments.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
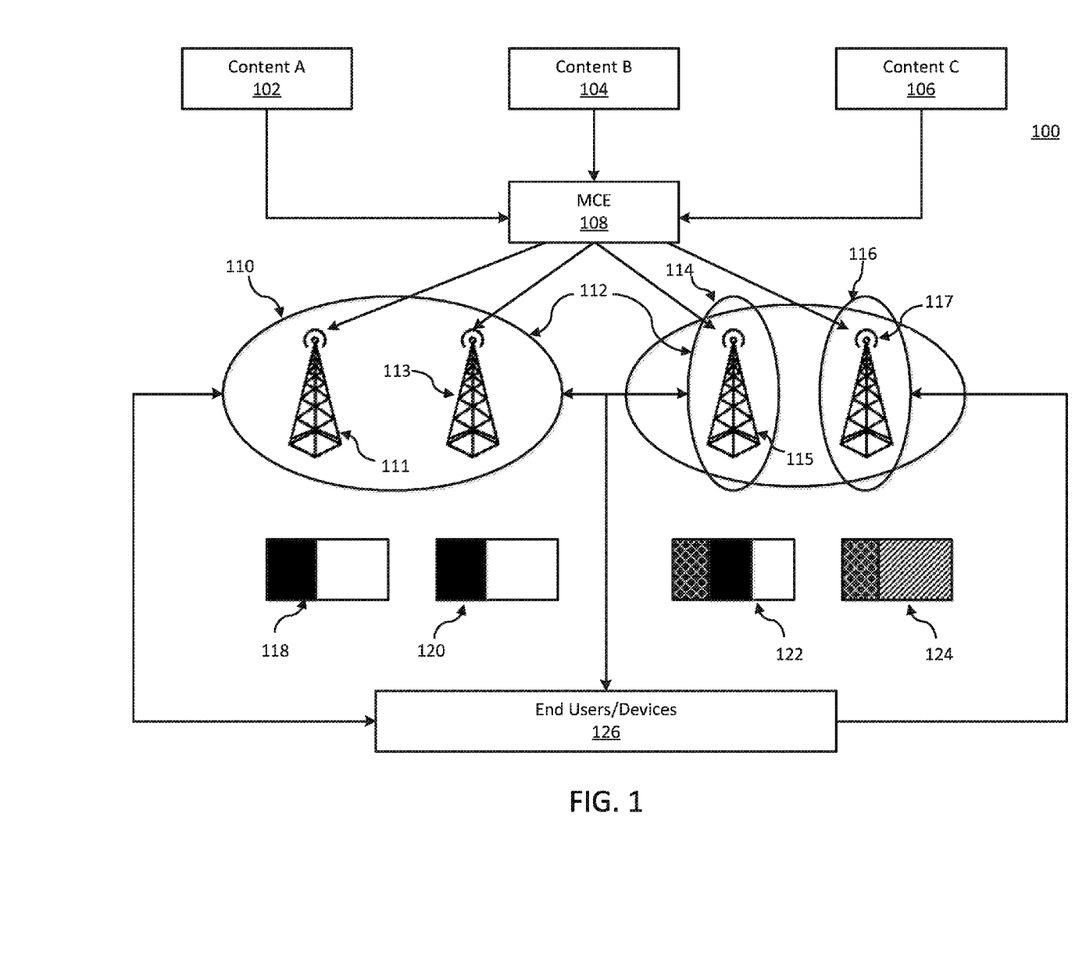
FIG. 1 is a diagram illustratively depicting a system/method for coordinating single frequency network (SFN) transmission using a central controller, in accordance with one embodiment of the present principles.

Referring now to FIG. 1, a diagram illustratively depicting a system/method for coordinating single frequency network (SFN) transmission 100 using a central controller is shown in accordance with one embodiment of the present principles. Prior to discussing various embodiments of the present principles in detail, some background on data transmission over LTE networks (e.g., Multicast Coordination Entity (MCE) coordinated SFN transmission) is included.

In one embodiment, each LTE frame may include subframes of 1 ms. duration each. The basic unit of allocation is a resource block (RB) representing a two-dimensional allocation of twelve OFDMA subcarriers (frequency domain) and seven symbols (0.5 ms. in time domain). Each user equipment (UE) 126 informs the eNB 111 of its channel quality, which then helps the eNB 111 choose an appropriate MCS. Since SFNs 110, 112, 114, and 116 involve scheduling a commonly-subscribed session on the same set of RBs 118, 120, 122, and 124 (and using the same MCS) across synchronized eNBs 111, eMBMS employs a central controller 108 (e.g., Multicast Coordination Entity (MCE)), which determines and controls the RB scheduling and MCS selection, and disseminates this information to the eNBs 111. However, when an eNB additionally serves unicast flows (e.g., e-mail, FTP download etc.), the eNB 111 may also be responsible for pertinent scheduling decisions. Each eNB 111 can use a maximum of six (out of ten) sub-frames in a frame to schedule eMBMS sessions. Therefore, at least four sub-frames are guaranteed for unicast traffic according to one embodiment of the present principles.

In one embodiment, an exemplary system 100 including MCE coordinated SFN transmission is illustratively depicted according to an embodiment of the present principles. In this embodiment, four eNBs 111, 113, 115, and 117 are serving three broadcast sessions (A 102, B 104, and C 106). Each eNBs 111 RB allocation is illustrated in the corresponding blocks 118, 120, 122, and 124 below them in the diagram. There are four SFN clusters: SFN 110 includes the first two eNBs 111, 113, jointly transmitting session A 118; SFN 112 includes only the third eNB 115, and also serves session A 120 (but uses different set of RBs); SFN 114 includes only the last two eNBs 115, 117, which jointly transmit session B 122; and SFN 116 includes only the last eNB 116, and serves session C 124.

This example shows three important rules employed for eMBMS according to some embodiments of the present principles. First, the eNBs 111, 113, 115, 117 serving the same session (e.g., content) as part of an SFN 110, 112, 114, 116 use the same RB allocation 118, 120, 122, 124 and MCS (e.g., first two eNBs jointly serving session A as part of SFN 110). Next, a given session can be served by more than one SFN (each having a potentially different set of RBs and MCSs). In this case, SFNs 110, 112, 114, 116 cannot have common eNBs 111, 113, 115, 117 (e.g., session A served by SFNs 1 and 2, which do not have an eNB in common). Lastly, in some embodiments, SFN clusters 110, 112, 114, 116 can overlap, which means that a given eNB 111, 113, 115, 117 can be a part of multiple (up to eight) SFNs, serving different sessions. In case of such an overlap, MCE 108 ensures that session RB allocations 118, 120, 122, 124 are orthogonal (e.g., the third eNB 115 is part of SFNs 112 and 114 and uses different sets of RBs for sessions A 120 and B 122) according to various embodiments of the present principles.

The present principles may be employed to jointly optimize SFN clusters and RB allocation to maximize system performance (e.g., by clustering eNBs into cooperating SFNs (MBSFN clustering)), according to various embodiments, which will be described in further detail herein after. It is noted that although various hardware configurations and numbers of flows/frames are illustratively depicted, other configurations and any number of flows/frames are contemplated according to various embodiments of the present principles.

Figure 2A:
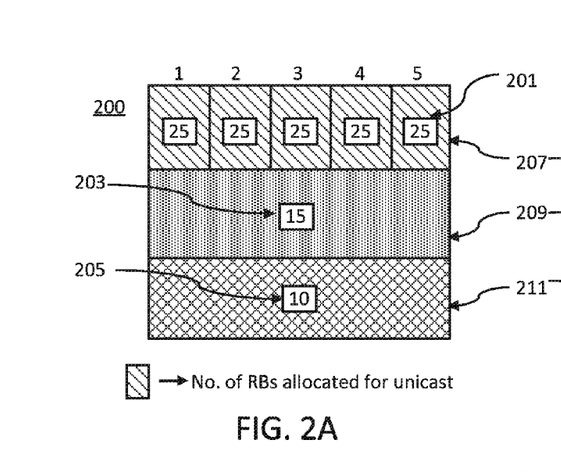
FIGS. 2A-2C are diagrams showing examples of a tradeoff between diversity gain and resource multiplexing gain in an Evolved-Multimedia Broadcast Multicast Services (eM-BMS) system, in accordance with embodiments of the present principles.
Figure 2B:
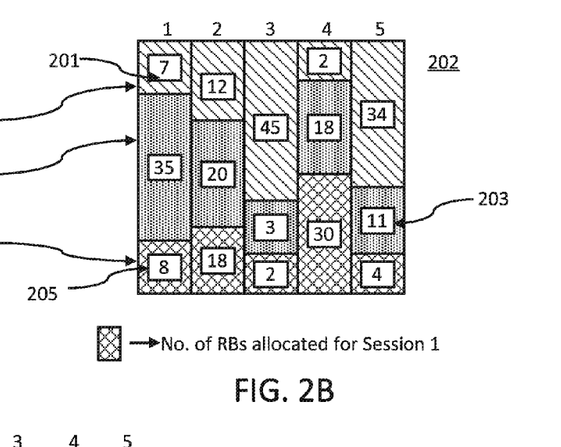
Figure 2C:
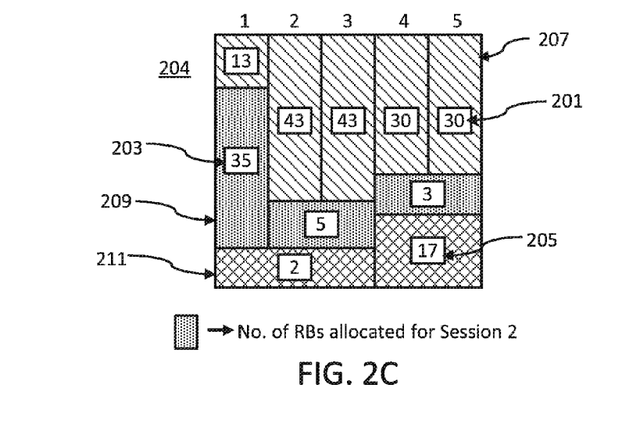

Referring now to FIGS. 2A-2C, diagrams showing examples of a trade-off between diversity gain and resource multiplexing gain in an Evolved-Multimedia Broadcast Multicast Services (eMBMS) system 200, 202, and 204, respectively, are illustratively depicted in accordance with embodiments of the present principles. For illustrative purposes, we show an LTE network with a set N of eNBs with identical configurations such as frequency, bandwidth and Omni-directional antennas. In some embodiments, each eNB has B RBs per LTE frame. There is a set K of broadcast sessions as part of the eMBMS service. Each session k∈K can be bursty, which imposes a per-frame finite buffer (denoted by $R_k$). Each UE subscribes to either one of the broadcast sessions in K and/or has a unicast flow. The set of UEs subscribing to a session k form the eMBMS group for that session. The set M denotes the UEs that have unicast flows. UEs are uniformly distributed in the network and associate to that eNB yielding the strongest signal according to the present principles.

In one embodiment, a tradeoff between transmit diversity gain and resource multiplexing gain is determined and/or applied according to the present principles. In one embodiment, by grouping eNBs in an SFN, the otherwise destructive interference among them that results in UEs having poor channel quality, becomes constructive (e.g., diversity gain). Since the MCS of a broadcast session is determined by the UE with minimum MCS, a large SFN including many eNBs may increase such UEs' Signal to Interference-plus-Noise Ratio (SINR) (and thus, the minimum MCS across all UEs). This further improves the per-RB data rate for the session over conventional systems and methods.

In some embodiments, large SFNs enforce the minimum MCS (and the resulting RB allocation) across the constituent eNBs and may result in all UEs being bound by the same per-RB rate (despite some UEs supporting higher rates even without transmit diversity). Alternatively, small SFN clusters decouple eNBs, allowing them to choose disparate MCSs (and RB allocations) by leveraging the channel diversity across UEs. Therefore, each eNB can flexibly allocate its resources across multiple sessions that it serves, leading to better RB multiplexing (utilization) according to the present principles. However, smaller SFNs lose the transmit diversity gain of larger SFNs and may suffer from inter-eNB interference, which may adversely impact the MCSs of some UEs. It is noted that SFN clustering may not only impacts a session's MCS (and the number of required RBs to deliver it) but also may impact the residual RBs at eNBs available to other broadcast sessions and unicast flows. This tradeoff between larger clusters (transmit diversity gain) and smaller clusters (resource multiplexing gain) is a core challenge facing the design of an efficient eMBMS system.

In FIGS. 2A-2C, this tradeoff is illustratively depicted with five eNBs {1, 2, 3, 4, 5} (each having 50 RBs 201, 203, and 205), two broadcast sessions and backlogged unicast traffic. Broadcast sessions have finite buffers of $R_1$ and $R_2$, respectively. We define the following schemes for SFN clustering: (FIG. 2A) single large SFN, where all eNBs are grouped into one SFN {1, 2, 3, 4, 5} collectively serving the two broadcast sessions, (FIG. 2B) single-cell broadcast, where each eNB is a singleton SFN by itself serving each session independently, and (FIG. 2C) SFN clustering, which forms session-specific sets of SFN clusters by addressing the above-mentioned tradeoff (described in further detail hereinafter). We also define $u_k(S)$ to be the UE with the minimum MCS within SFN S for session k. Note that the higher the MCS of $u_k(S)$, the lower the number of RBs required to deliver k in S for the same throughput according to the present principles.

In one embodiment, a single-large SFN 200 is employed according the present principles, as shown in FIG. 2A. In this embodiment, since all eNBs are part of the same SFN 209, 211, the diversity gain is maximum here. Hence, this yields the highest MCS for UEs $u_1(\{1, 2, 3, 4, 5\})$ and $u_2(\{1, 2, 3, 4, 5\})$. We may assume that UE $u_1(\{1, 2, 3, 4, 5\})$ is associated to eNB 4 (employing 10 RBs 205 for $R_1$) and UE $u_2(\{1, 2, 3, 4, 5\})$ is associated to eNB 1 (employing 15 RBs 203 for R2). With the common allocation across all five eNBs, 125 RBs are used for broadcast. The residual RBs can be used to serve unicast flows, for a total of 125 RBs 201 according to the present principles.

In one embodiment, a single cell broadcast 202 is employed according to the present principles, as shown in FIG. 2B. In this embodiment, the eNBs operate independently while being subject to the highest interference (minimum diversity gain). Each eNB n allocates RBs based only on $u_1(\{n\})$ and $u_2(\{n\})$. In other words, there is no common RB allocation and MCS enforced across eNBs 1, 2, 3, 4, 5. Due to reduced diversity gain, UEs $u_1(\{1, 2, 3, 4, 5\})$ and $u_2(\{1, 2, 3, 4, 5\})$ now support a lower MCS than the single-large SFN 200 (as observed by the usage of more RBs at eNBs 1 and 4 for session 2 204 and session 1 202, respectively). The same impact can be seen for eNB 2 for session 1 202; MCS of $u_1(\{2\})$ is less than that of $u_1(\{1, 2, 3, 4, 5\})$, where $u_1(\{2\}) \neq u_1(\{1, 2, 3, 4, 5\})$.

In some embodiments, some eNBs require much fewer RBs than the single-large SFN 200. For example eNB 3 requires fewer RBs for session 1 202, indicating that MCS of u1({3}) is greater than that of $u_1(\{1, 2, 3, 4, 5\})$, if and only if $u_1(\{3\})$ $u_1(\{1, 2, 3, 4, 5\})$. This happens in cases, such as when all UEs, attached to an eNB (e.g., 1, 2, 3, 4, 5) and subscribing to a session, are at a cell-center. So, the minimum MCS would also be a relatively high value. In one embodiment, whether single-cell broadcast 202 employs more (or less) RBs than single-large SFN depends on the effect of interference and how the UEs are distributed. In this example, more RBs 207 (e.g., 48 RBs for broadcast) are employed overall to satisfy the broadcast demand (with only 100 RBs left for unicast flows). In other words, the negative impact of additional interference may outweigh the benefits of MCS decoupling across eNBs in this embodiment.

In one embodiment, SFN clustering 204 is employed according to the present principles, as shown in FIG. 2C. In this embodiment, the set of SFNs for session 1 202 is {1, 2, 3} and {4, 5}, and it is {1}, {2, 3} and {4, 5} for session 2 204. Common RB allocation and MCS may be enforced within each SFN according to the present principles. For example, eNBs 1, 2 and 3 may use the same allocation for session 1 202 based on the MCS of $u_1(\{1, 2, 3\})$. Within each SFN, there is still transmit diversity gain but the eNBs that belong to different SFNs interfere with each other (e.g., eNBs 3 and 4). We again observe that decoupling eNBs across SFNs (e.g., 211) creates a varying number of RBs required to deliver the broadcast sessions in each SFN (similar to single-broadcast). However, this scheme retains the transmit diversity benefit of SFNs to some degree (e.g., MCS of $u_1(\{1, 2, 3\})$ is greater than those of u1({1}) and u1({2})), as evident from less RBs 203, 205 employed for session 1 202.

In some embodiments, with different sessions facing bottlenecks potentially in different SFNs (e.g., 209, 211), an intelligent SFN clustering mechanism according to the present principles enables the most efficient utilization of RBs employed for broadcast, making the most RBs 209, 211 (159 RBs total) available for unicast flows. Single-cell broadcast 202 and single large SFN 200 operate at two ends of the spectrum, with the former maximizing the resource multiplexing (utilization) gain and the latter maximizing the transmit diversity gain. However, the optimal configuration often lies in between, and the present principles may be employed to strike the right balance between these conflicting objectives.

In one embodiment, a challenge in realizing intelligent SFN clustering lies in identifying the interference dependencies in the network. Since the distribution of UEs may vary across sessions, SFN clustering may be executed separately for each session. This is further complicated by the fact that an eNB can serve multiple broadcast sessions, where the impact of SFN clusters plays a bigger role. If not executed efficiently, the complexity of computing the SFN clusters for each session (subscribed by a plurality (e.g., hundreds) of UEs) and actual allocation of resources can get highly complex. As described in further detail herein below, the present principles may be employed to address this challenge efficiently while remaining practical to implement according to various embodiments.

Figure 3:
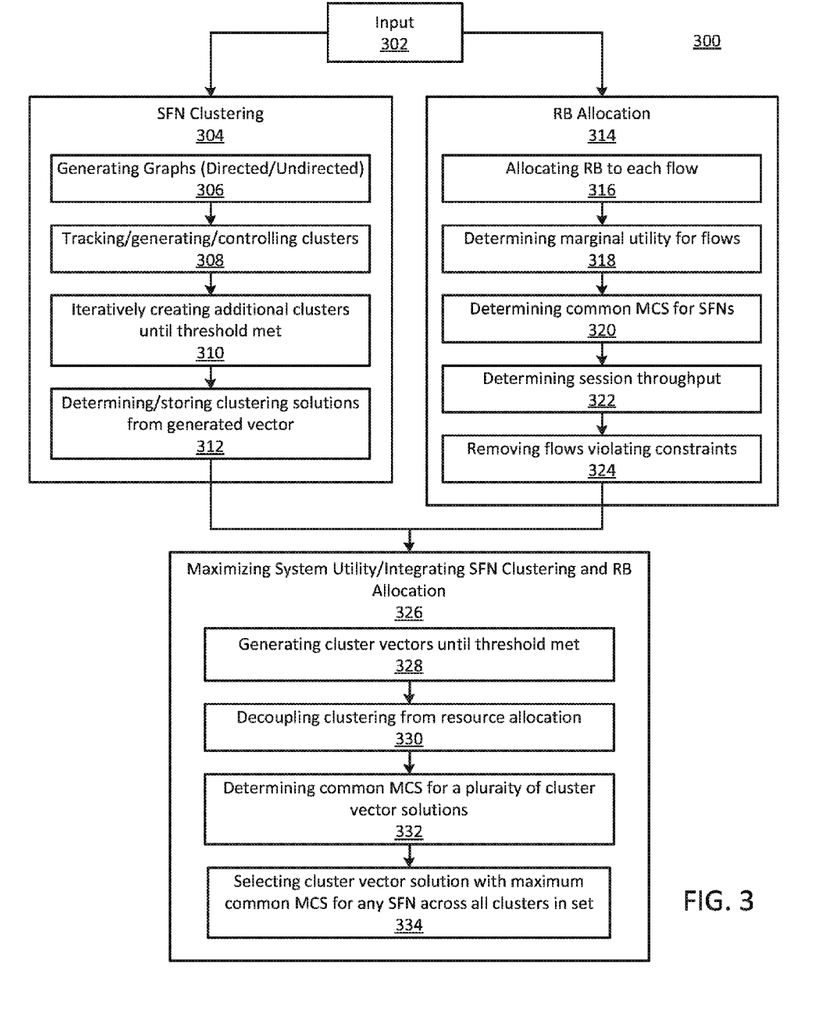
FIG. 3 is a block/flow diagram illustratively depicting a method for maximizing aggregate system utility and overall data transmission/broadcasting performance, in accordance with one embodiment of the present principles.

Referring now to FIG. 3, a block/flow diagram showing a method for maximizing aggregate system utility and overall data transmission/broadcasting performance 300 is illustratively depicted in accordance with one embodiment of the present principles. In one embodiment, an objective of the method 300 is to maximize the aggregate system utility of unicast and broadcast flows in each frame. The utility of a flow may be based on proportional fairness (PF), defined as the log of its throughput. A higher PF utility ensures serving a larger number of sessions with higher throughput. For a unicast flow, defining its utility is relatively simple, but for a broadcast session, it is more complex, and may be defined as the log of the minimum throughput across the SFNs serving the session. The utility is defined per frame since the bursty traffic may affect the amount of data to be served in each frame. In some embodiments, it is adequate to assume that the traffic remains constant within a frame.

In one embodiment, there are two inter-dependent sub-problems that need to be addressed for the above-described objective. The first sub-problem is SFN clustering 304 (e.g., to determine the set of eNBs that cooperatively serve each broadcast session). The second is RB allocation 314, in which the RBs available to an eNB may be multiplexed between broadcast sessions and unicast flows according to the present principles. To determine maximum utility, we may formulate our utility maximization problem with the following Integer Program (IP) (the notations are listed in Table 1):

Maximize $_{X,Y,C}$ $\quad \sum_{k \in K} \alpha_k \log A_k + \sum_{m \in M} \sum_{n \in N} \alpha_m \log(Q_{m,n} Y_{m,n})$ (1)

subject to $\quad F_{k,C} X_{k,n} \geq A_k, \forall k \in K, C \in \mathbb{C}_k, n \in C$
$\quad F_{k,C} X_{k,n} \leq R_k, \forall k \in K, C \in \mathbb{C}_k, n \in C$ $\quad \sum_{n \in N} Q_{m,n} Y_{m,n} \leq R_m, \forall m \in M$ $\quad \sum_{k \in K} X_{k,n} \leq \theta \cdot B, \forall n \in N$ $\quad \sum_{k \in K} X_{k,n} + \sum_{m \in M} Y_{m,n} \leq B, \forall n \in N$ $\quad X_{k,n} \in \{0, 1, 2, \ldots \theta \cdot B\},$
$\quad Y_{m,n} \in \{0, 1, 2, \ldots B\}$

TABLE 1

Notations

| Symbol | Description |
|---|---|
| K | Set of broadcast sessions |
| M | Set of unicast UEs/flows |
| $A_k$ | Throughput of broadcast session k |
| I | Set of entities (sessions and unicast flows), i.e., I = K ∪ M |
| $R_i$ | Finite buffer of entity i |
| $\mathbb{C}_k$ | Set of SFN clusters configured to serve session k |
| C | An SFN cluster (i.e., a set of eNBs) C ∈ $\mathbb{C}_k$ serving session k |
| $F_{k, C}$ | Per-RB rate yielded by SFN C ∈ $\mathbb{C}_k$ for session k, computed based on the minimum MCS of all UEs served by the eNBs in C |
| $Q_{m, n}$ | Per-RB rate yielded by eNB n to unicast UE m, computed based on the MCS of the link between n and m (does not change with SFNs). |
| $X_{k, n}$ | No. of RBs allocated from eNB n to broadcast session k |
| $Y_{m, n}$ | No. of RBs allocated from eNB n to unicast UE m |
| $\alpha_{k(m)}$ | Priority weight of broadcast session k (or unicast flow m) |
| B | Total number of RBs available to each eNB per frame |
| θ | Fraction of the RBs that can be assigned to broadcast sessions |

The following terms are described for ease of understanding of various embodiments of the present principles.
Output:
The output variables are $X_{k,n}$, $Y_{m,n}$, $\mathbb{C}_k$, $F_{k,c}$, and $A_k$.
Input:
The input parameters are $R_i$, B, θ, $Q_{m,n}$ and $\alpha_k(\alpha_m)$.
Constraints:
In some embodiments, a first constraint ensures that the throughput yielded by all SFNs for session k is at least as high as $A_k$, where $A_k$ is the session throughput (calculated as the minimum throughput across all C∈$\mathbb{C}_k$) that is to be maximized. The second and third constraints enforce that the scheduled data is limited by the data in the buffer. The fourth and fifth constraints indicate that, on any eNB, the total RB allocation for broadcast is limited by θ·B, and the net RB allocation for all flows is limited by B. A last constraint ensures integral allocation of RBs.

Additional Definitions

Each SFN C has a distinct broadcast MCS (that determines $F_{k,c}$) that is calculated as the minimum MCS supported by the UEs in SFN's coverage (e.g., union of coverages of the eNBs in the SFN). This MCS value is denoted as the SFN's common MCS. The UE that decides this particular MCS value is called SFN's bottleneck UE. We also define the bottleneck MCS of a session k to be the minimum common MCS across all SFNs C∈$\mathbb{C}_k$. Similarly, the bottleneck UE of the session is the one that decides the session's bottleneck MCS.

Hardness:

An optimization version of an NP-Hard multi-way partition problem be easily reduced to an SFN clustering problem according to the present principles to generate a feasible set of non-overlapping SFN clusters for every session (e.g., covering all eNBs serving that session) according to various embodiments. It is noted that some details are omitted herein for clarity and space constraints. A special case of our problem is to solve the integral RB allocation for multiple broadcast sessions, even when SFN clusters are already given. However, even this simpler version has been shown to be NP-hard, thereby making the joint problem of clustering and RB allocation significantly harder.

In one embodiment, given the hardness of the problem, a lightweight and efficient solution that solves the two interdependent sub-problems (e.g., SFN clustering 304 and RB allocation 314) may be performed according to the present principles. In one embodiment, for a given broadcast session, SFN clustering may group a plurality of eNBs into sets of cooperative SFNs (i.e., clusters) in block 304. Since each cluster enforces common RB allocation across its constituent eNBs, it poses constraints on RB allocation in block 314. Further, SFNs determine the amount of transmit diversity, which in turn impacts the MCS of broadcast UEs and thus the per-RB data rate delivered to such UEs (and all others in the SFN due to the common MCS).

In some embodiments, since subscription of UEs varies across broadcast sessions, SFN clusters may be determined for each session separately in block 304, each posing their own constraints and MCSs. On the other hand, RB allocation efficiently assigns RBs to all flows (including broadcast sessions and unicast flows) in block 314, thereby revealing the aggregate utility. It is noted that the ability of RB allocation 314 to multiplex different flows (and hence achieve the utility gain that can be obtained from it) depends heavily on the constraints posed by SFNs, which contribute their own gain in terms of transmit diversity according to various embodiments.

In one embodiment, due to this tradeoff between the diversity gain (from large SFNs) and multiplexing gain (from efficiently packing multiple flows enhanced by smaller SFNs), an alternating optimization approach is performed for maximizing aggregate utility (as described in further detail herein below with respect to FIG. 4). An initial set of clusters that corresponds to maximizing the diversity gain for each session (e.g., single-large SFN) may be created, and the corresponding utility may be obtained by performing RB allocation. We then give up some diversity gain, in a controlled manner, by deviating away from the single-large SFN cluster and progressively creating smaller clusters. It is then determined if this can be compensated for by the gains from improved RB multiplexing/utilization, resulting from at least one such SFN cluster yielding a higher common MCS than the single-large SFN. This way, the clusters may be iteratively refined, and RB allocation may be run in block 314 until the combination with maximum utility is determined. In doing so, the present principles may be employed to avoid going through all feasible SFNs for sessions, which is combinatorial in nature. The solutions to address each one of these components and how they are synergistically employed will be described in further detail herein below.

In one embodiment, SFN clustering is performed in block 304 according to the present principles. SFN clustering may have two constraints for a given broadcast session: (i) the clusters may cover all eNBs that have some subscribers to the session and ii) no eNB should be included in more than one cluster of the same session. To generate feasible clusters, the present principles may be employed to generate and/or leverage graph representation of eNBs in block 306, and utilize heuristics to a well-known minimum p-cut problem according to various embodiments.

In one embodiment, there is a graph for each session, where vertices are eNBs (whose users subscribe to the given session) and weighted edges capture the transmit diversity gain between eNBs if they were to be operated together as part of an SFN. A pair of eNBs without an edge means that the two eNBs do not yield transmit diversity gain when in coordination (e.g., due to being far away from each other). Solving the min p-cut problem on this graph results in minimum level of additional interference (by removing edges and losing the transmit diversity gain) and creates p connected components. In other words, in one embodiment, the cut decouples those pairs of eNBs that contribute very little to each other's transmit diversity gain (captured by the edge weight). Since connected components have no vertex (eNB) in common due to the cut and no vertices are removed, each connected component becomes an SFN cluster and the set of clusters are feasible according to the present principles.

In block 306, even though the min p-cut problem provides useful intuition, it does not directly address the SFN clustering problem. Hence, an eNB graph may be constructed in block 306 in an intelligent fashion to be able to use known min p-cut heuristics to obtain a feasible solution to our problem. Formally, min p-cut problem solves the following: Given an undirected graph G=(V,E) with positive real number edge weights and an integer p, find the set of edges E'∈E with minimum total weight, whose removal creates p connected components in G.

In some embodiments, on the other hand, the present principles may be employed to solve the following problem for SFN clustering: Given an undirected graph G=(V,E) with positive real number edge weights, an integer p and an integer $\delta \in \mathbb{Z}^+$, create p connected components in G such that the resulting bottleneck MCS is at most $\delta$ levels worse than the one yielded by the single-large SFN. For example, in one embodiment, if a single-large SFN provides MCS level 7 (e.g., 64-QAM with coding rate 5/6), then the resulting MCS may not be worse than MCS level 5 corresponding to 64-QAM with coding rate 1/2. The parameter $\delta$ is crucial to performing alternating optimization according to the present principles since it enables control of the amount of transmit diversity gain traded off for resource multiplexing gain.

In one embodiment, the graph construction in block 306 may be performed according the following method:

---
Method 1 Graph Construction: construct_graph ($\delta$, k)
---

1: Define directed graph G = (V, E) where V contains each eNB serving session k. Let $MCS_{max}^k$ be the minimum MCS for session k's subscribers resulting from a single-large SFN (i.e., SFN including all eNBs in V). Let $z_k$ be the SINR threshold required by the MCS level $MCS_{max}^k - \delta$. Let $\{i, j\}$ be a directed edge from i to j, $\forall i, j \in V$.
2: for all $j \in V$ do
3:    Let $x_j$ be the min. SINR of any UE associated to j that subscribes to session k, resulting from a single-large SFN.
4:    Set $\hat{\rho}_j := \max \{x_j - z_k, 0.000001\}$ (to avoid $\hat{\rho}_j = 0$)
5:    for all $i \in V$, where $i \neq j$ do
6:      Let $y_{i,j}$ be the min. SINR of any UE associated to j that subscribes to session k as a result of SFN V \ $\{i\}$.
7:      Set $\rho_{ij} = x_j - y_{i,j}$
8:      if $\rho_{ij} > \rho_{min}$ then
9:         Add directed edge $\{i, j\}$ (from i to j) to E
10:      end if
11:    end for
12: end for
13: for all $\{i, j\} \in E$ do
14: 
$$\text{Set edge weight } w_{ij} := \log\left(\left(1 - \min\left\{1, \frac{\rho_{ij}}{\hat{\rho}_j}\right\}\right)^{-1}\right)$$

15: end for
16: Create empty set $\overline{E}$.
17: for all $i, j \in \overline{V}$, where $i \neq j$ do
18:    Define an undirected edge $e = \{i, j\}$ with weight equal to $\overline{w}_{ij} := w_{ij} + w_{ji}$. Add e to $\overline{E}$.
19: end for
20: Return undirected graph $\overline{G} = (V, \overline{E})$.

---

In one embodiment, in block 306, a directed graph G=(V,E) is constructed, where each vertex $i \in V$ represents an eNB, and each edge $\{i,j\} \in E$ indicates that eNB I contributes an SINR of $\rho_{ij}$ to BS J. To determine $\rho_{ij}$, we first define $x_j$ to be the SINR (in dB) of the weakest UE (e.g., the one with the min. SINR) of eNB j, when we have a single large SFN (e.g., all eNBs are cooperatively transmitting, which maximizes the diversity gain) as in Line 3 of Method 1. Now, if eNB i is removed from the single large SFN, it may result in SINR degradation for eNB j's UEs since the transmit diversity gain is reduced and interference is experienced from eNB I according to the present principles. It may be assumed that the weakest UE of eNB j (which could be a different UE than the one in the first case) now has an SINR of $y_{i,j}$ dB (Line 6 of Method 1). Thus, due to the impact of eNB i alone, eNB j may lose $\rho_{ij} = x_j - y_{i,j}$ dB of SINR when compared with the single large SFN (Line 7 of Method 1). If $\rho_{ij}$ is greater than a predetermined threshold (e.g., $\rho_{min}$), then the edge $\{i, j\}$ may be added to E (Line 9 of Method 1) according to the present principles.

In one embodiment, a weight $\hat{\rho}_j$ may be assigned to each vertex j during graph construction in block 306. To accomplish this, the present principles may be employed to first define $MCS_{max}^k - \delta$ to be the bottleneck MCS for session k's subscribers when we have a single large SFN since transmit diversity gain is the maximum in this case. For a given $\delta$ and session k, the present principles may be employed to ensure that the resulting bottleneck MCS of the cut (the cut procedure will be described in further detail herein below) is no less than $MCS_{max}^k - \delta$. Assuming the existence of a rate table that maps SINR values to MCS levels, $z_k$ may be defined to be the minimum SINR required to support an MCS of $MCS_{max}^k - \delta$. For each vertex j, we take the weight $\hat{\rho}_j$ to be $x_j - z_k$, which captures the maximum SINR margin that the eNB j can afford to lose by moving away from a single large SFN until it no longer supports $MCS_{max}^k-\delta$ (Line 4 of Method 1) according to the present principles.

In one embodiment, in block 306, having defined the SINR margin ($\hat{\rho}_j$) of vertices and the impact ($\rho_{i,j}$) between them, the present principles may now be employed to define a weight for each edge $\{i, j\}$ to be to be $$w_{ij} = \log\left(\left(1 - \min\left\{1, \frac{\rho_{ij}}{\hat{\rho}_j}\right\}\right)^{-1}\right)$$

(Line 14 of Method 1). This captures the relative loss in SINR $$\left(\frac{\rho_{ij}}{\hat{\rho}_j}\right)$$

at eNB j if BS i were to be removed from its SFN cluster. In one embodiment, min-cut is employed in block 306 to remove edges with small weights and hence create multiple smaller SFNs out of the single large SFN while supporting a target MCS of at least $MCS_{max}^k-\delta$. Small weights ($w_{ij}$) denote edges that could be removed without significantly hurting the target MCS, while large weights denote that such edges would better be kept intact to avoid going below the target MCS. The exponential choice of the weight function allows edge weights to go to 1 when the vertex margins $$\left(1 - \min\left\{1, \frac{\rho_{ij}}{\hat{\rho}_j}\right\}\right)$$

approach 0, thereby preventing such edges from being cut according to the present principles.

In some embodiments, for larger values of $\delta$ (e.g., larger tolerable loss in relative losses get smaller since the vertex margins increase (while $\rho_{ij}$ stays the same). Thus, we have the freedom to cut more edges according to the present principles (e.g., creating more SFN clusters that enable better multiplexing) as $\delta$ is progressively increased (e.g., decreasing transmit diversity gain). In one embodiment, before the min p-cut procedure may be employed using the generated graph, the graph may be converted into an undirected graph in block 306. This may be performed by replacing the pair of directed edges $\{i, j\}$ and $\{j, i\}$ with a single undirected edge, with its weight being the sum of the pair of directed edges (Line 18 of Method 1) according to the present principles.

In one embodiment, after generating the undirected graph in block 306, a heuristic to the min p-cut problem may be employed to generate one or more SFN clusters in block 308 according to the present principles. In one embodiment, the present principles may be employed to compute a min 2-cut in each of the existing clusters and split that cluster whose partitioning yields the smallest cost (e.g., sum of the weights of removed edges) into two. In finding the min 2-cut on a cluster, the method may employ, for example, the max-flow min-cut theorem and Ford-Fulkerson algorithm. In one embodiment, the method increases the number of clusters by one at each iteration in block 310 until it produces p clusters. It is known to exhibit an approximation ratio or $$2*\left(1 - \frac{1}{p}\right)$$

according to various embodiments of the present principles.

For example, in one embodiment, for ease of illustration, assume that we want to compute the min 4-cut on a graph that represents the single-large SFN. The heuristic may initially yield two clusters after it solves the min 2-cut problem on the graph. Next, it may compute a min 2-cut in each of the two clusters and may save the associated cost with each potential cut. After comparing the cost of the two potential cuts, it retains the cut with the minimum cost, meaning that one of the clusters is further split into two (yielding three clusters). Next, it computes the min 2-cut in each of the three clusters and splits the minimum cost cluster into two, generating four clusters as expected according to the present principles.

In one embodiment, in block 308, the above heuristic creates p clusters, but it does not track the bottleneck MCS exhibited by the final set of clusters. Thus, an external control loop may be implemented according to the present principles in block 308 to ensure that only those sets of clusters that support a target MCS (e.g., $MCS_{max}^k-\delta$) are employed. Method 2 (below) illustrates how the heuristic may be controlled according to the present principles:

---

Method 2 Determine Min-cuts: min_cuts ($\delta$, k)

1: Call $G_k$ := construct_graph($\delta$, k)
2: Let $\vec{\mathbb{C}}_k(\delta)$ be the vector containing candidate SFN clusters for session k and $\delta$. An element in $\vec{\mathbb{C}}_k(\delta)$ is a set of clusters $\mathbb{C}_k$ (p) generated by solving min p-cut on $G_k$. Note that $|\mathbb{C}_k$ (p)$| = p$.
3: Let $MCSc_{k(p)}$ be the bottleneck MCS of session k revealed by $\mathbb{C}_k$ (p), and $\xi(\mathbb{C}_k$ (p)) be the max. common MCS of SFNs in $\mathbb{C}_k$ (p).
4: Set p = 2 and $\vec{\mathbb{C}}_k(\delta) := \emptyset$
5: while true do
6:    Obtain $\mathbb{C}_k$ (p) by running the min p-cut heuristic.
7:    if $MCSc_{k(p)} \geq MCS_{max}^k - \delta$ and $\xi(\mathbb{C}_k$ (p)) $\geq MCS_{max}^k$ then
8:       Add $\mathbb{C}_k$ (p) to $\vec{\mathbb{C}}_k(\delta)$. Set p := p + 1
9:    else
10:       Exit while loop
11:    end if
12: end while
13: Return $\vec{\mathbb{C}}_k(\delta)$

---

In one embodiment, in block 310, the min p-cut may be employed in Method 2 to iteratively create more clusters until the target MCS can no longer be supported (e.g., threshold condition met). Upon termination, in block 312, the procedure may return $\vec{\mathbb{C}}_k(\delta)$, which is a vector containing the clustering solutions for all values of p (e.g., from 2 to the point where the target MCS is not supported). In one embodiment, the present principles may be employed to only include those clustering solutions that exhibit an SFN with a common MCS larger than $MCS_{max}^k$, while supporting the target MCS (Line 7 of Method 2). This is important to obtain a better RB utilization than the single-large SFN (e.g., as described above with reference to FIG. 2).

In one embodiment, the cluster vector generated in block 304 may be leveraged to determine maximum system utility in block 326 according to the present principles. Generating a cluster vector for each session and $\delta$ have been described with reference to block 304. Next, the SFN clustering 304 may be integrated with RB allocation 314 in block 326 to discover and/or apply maximum utility for a system, as described by Method 3 (below):

---
Method 3 Discover max. utility: max_util
---

1: for all k ∈ K do
2:   Let $MCS_{min}^k$ be the bottleneck MCS of session k as a result of single-cell broadcast (i.e., min. diversity gain). Set $\delta := 0, \Delta_k = \emptyset$
3:   while $MCS_{max}^k - \delta \geq MCS_{min}^k$ do
4:     Set $\vec{\mathbb{C}}_k(\delta) := \text{min\_cuts}(\delta, k)$
5:     Set $\Delta_k := \Delta_k \cup \{\delta\}, \delta := \delta + 1$
6:   end while
7: end for
8: Set $\Delta := \cup_{k \in K} \Delta_k$.
9: for all $\delta \in \Delta$ do
10:   for all k ∈ K do
11:     Let $\xi(\mathbb{C})$ be the maximum common MCS of any SFN in the set $\mathbb{C}$ of SFN clusters, $\forall \mathbb{C} \in \vec{\mathbb{C}}_k(\delta)$
12:     Set $\overline{\mathbb{C}}_k(\delta) := \arg\max_{\mathbb{C} \in \vec{\mathbb{C}}_k(\delta)} \xi(\mathbb{C})$
13:   end for
14:   Call $U_\delta := RB\_allocation(K, \delta)$
15: end for
16: for all k ∈ K do
17:   Set $\overline{\delta} := \arg\max_{\delta \in \Delta} U_\delta$
18:   Set $\mathbb{C}_k := \overline{\mathbb{C}}_k(\overline{\delta})$.
19: end for
20: Return $\mathbb{C}_k, \forall k \in K$ In one embodiment, all values of δ may be exhausted for each session and cluster vectors may be generated until the session's bottleneck MCS reaches the one supported by single-cell broadcast (Lines 3-6 of Method 3) in block 328 according to the present principles. In other words, smaller clusters may be iteratively created until we approach the extreme case (e.g., threshold) where each eNB operates in isolation (e.g., minimum diversity gain). Ideally, it is desirable to consider all possible combinations of clustering solutions across sessions during resource allocation, to determine the final solution (with $O(\Pi_k(|\mathbb{C}_k|))$ complexity). To avoid this prohibitive complexity, the present principles may be employed in block 330 to decouple clustering from resource allocation and intelligently select a clustering solution (e.g., with $O(|K|)$ complexity) such that it contributes to better multiplexing gains during resource allocation in block 314 according to various embodiments.

In one embodiment, in block 332, among all the candidate solutions in the cluster vector from block 304, the solution that has the maximum common MCS for any SFN across all the clusters in the set (Lines 11-12 of Method 3) may be selected. Note that in a cluster vector $\vec{\mathbb{C}}_k(\delta)$, all clustering solutions may have the same bottleneck MCS value for the session, $MCS_{max}^k - \delta$. Thus, by choosing the one with the maximum common MCS in block 334, the present principles ensure that at least some SFN(s) will benefit the most from being separated from the single-large SFN set (e.g., in terms of supporting a higher MCS).

In one embodiment, once the best candidate SFN configuration is determined and selected for each session and a given δ in blocks 332 and 334, RB allocation 314 may be repeatedly run for all δ values (Line 14 of Method 3). This enables a determination of the impact of giving up transmit diversity gain (e.g., by increasing δ) depending on how RB allocation multiplexes RBs across all flows according to various embodiments. By recording the utility $U_\delta$ produced with each δ, the solution that corresponds to the maximum utility (Lines 17-18 of Method 3) may be finalized and/or applied to maximize system utility according to the present principles.

In one embodiment, RB allocation in block 314 may be based on a water-filling (WF) variant of the PF method detailed in Method 4 (below) according to the present principles.

---
Method 4 RB allocation: RB_allocation(K, δ)
---

1: Set $\overline{K} = K, \overline{M} = M, A_k := 0, \forall k \in K$ and $A_m := 0, \forall m \in M$. Set $I := K \cup M$, let $n_m$ be the eNB to which UE m is associated.
2: For each $C \in \overline{\mathbb{C}}_k(\delta), \forall k \in K, X_{k,n} := X_{k,n} + 1, \forall n \in C$.
3: For each m ∈ M, set $Y_{m,n_m} := Y_{m,n_m} + 1$.
4: while $K \neq \emptyset$ and $M \neq \emptyset$ do
5:   Set $i' := \arg\max_{i \in I}\left(\alpha_i \cdot \dfrac{\overline{R}_i}{A_i}\right)$
6:   if $i' \in K$ then
7:     Set $C' := \arg\min_{C \in \overline{\mathbb{C}}_{i'}(\delta)} F_{i',C}$
8:     if $\sum_{k \in K} X_{k,n} < \theta \cdot B, \forall n \in C'$, and $F_{i',C'} \cdot X_{i',n} < R_{i'}, n \in C'$
     then
9:       Set $X_{i',n} := X_{i',n} + 1, \forall n \in C'$.
10:      If $F_{i', C} \cdot X_{i',n}$ is greater than that from any other SFN C, then do step 9 after checking step 8 for C.
11:      Set $A_{i'} := \min_{C \in \mathbb{C}_{i'}(\delta)}\{F_{i',C} \cdot X_{i',n'}\}, n' \in C$
12:    else
13:      Set $K := K \setminus \{i'\}$.
14:    end if
15:   else if $i' \in M$ then
16:     if $\sum_{m \in M} Y_{m,n_{i'}} + \sum_{k \in K} X_{k,n_{i'}} < B$ and $A_{i'} < R_{i'}$ then
17:       Set $Y_{i',n_{i'}} := Y_{i',n_{i'}} + 1, A_{i'} := Q_{i',n_{i'}} \cdot Y_{i',n_{i'}}$.
18:     else
19:       Set $M := M \setminus \{i'\}$
20:     end if
21:   end if
22:   Compute $U_\delta := \sum_{k \in K} \alpha_k \log A_k + \sum_{m \in M} \alpha_m \log A_m$.
23: end while
24: Return $U_\delta$ In one embodiment, in block 316, the present principles may be employed to allocate one RB to each flow (e.g., broadcast and unicast). In some embodiments, when allocating for a broadcast flow in block 316, the same RB is given to all the eNBs that are in each of the SFNs in $\mathbb{C}_k$ (Lines 2-3 of Method 4). In block 318, marginal utility may be determined for a plurality of flows to discover the flow that yields the maximum marginal utility to allocate the next RB to it (Line 10 of Method 4). For proportional fairness, the marginal utility of any flow i corresponds to the weighted ratio of the residual achievable throughput $\overline{R}_i$ of the flow to its past achieved throughput. For illustrative purposes, assume that the flow with the maximum metric (denoted by i') is a broadcast session.

In block 320, the present principles may be employed to determine common MCS for a plurality of SFNs, and may then determine the SFN with the minimum common MCS (per-RB rate) as C' and allocate one RB from all eNBs in C' (Lines 11-14 of Method 4). In one embodiment, if the net throughput yielded by C' becomes greater than that from any other SFN C, then one RB from all eNBs in such SFN clusters may be allocated according to the present principles (Line 15 of Method 4).

In one embodiment, in block 322, the session throughput may be determined as the minimum of all SFN throughputs according to the present principles (Line 16 of Method 4). These RB allocations are performed provided that (i) eNBs have not yet exhausted their broadcast allocation limit of $\theta$–B, and (ii) the throughput of every session is less than its upper-bound bit-rate. On the other hand, if the flow with the maximum PF metric is for a unicast UE m, then the unit RB may be allocated from the eNB, to which the UE is associated according to some embodiments. For other unicast flows, the net RB allocation may be limited to B RBs on any eNB, along with upper-bound throughput constraints. In one embodiment, in block 324, any flow violating the constraints may be removed from the set (Lines 18-24 of Method 4) according to the present principles.

In one embodiment, the overall complexity of the above joint methods may be represented as $O(|\Delta|(|K|S_{cut}(|N|)+S_{alloc}))$, where $S_{cut}(|N|)$ is the complexity of the min p-cut heuristic $O(p \cdot |N|^3)$, when run for $p=|N|$, and $S_{alloc}$ may be the complexity of the RB allocation procedure $O(B)|K||N|$ in block 314. As the two inter-dependent SFN clustering 304 and RB allocation 314 sub-problems are each NP-hard, it may be difficult to obtain an overall performance guarantee for the solution. However, by employing the efficient methods described above for each of the individual sub-problems 304, 314, coupled with an alternating optimization approach to account for their tight dependency, the present principles may be applied to control and maximize performance gains in practical settings (e.g., network-wide broadcasting, data transport, etc.) according to various embodiments.

Figure 4:
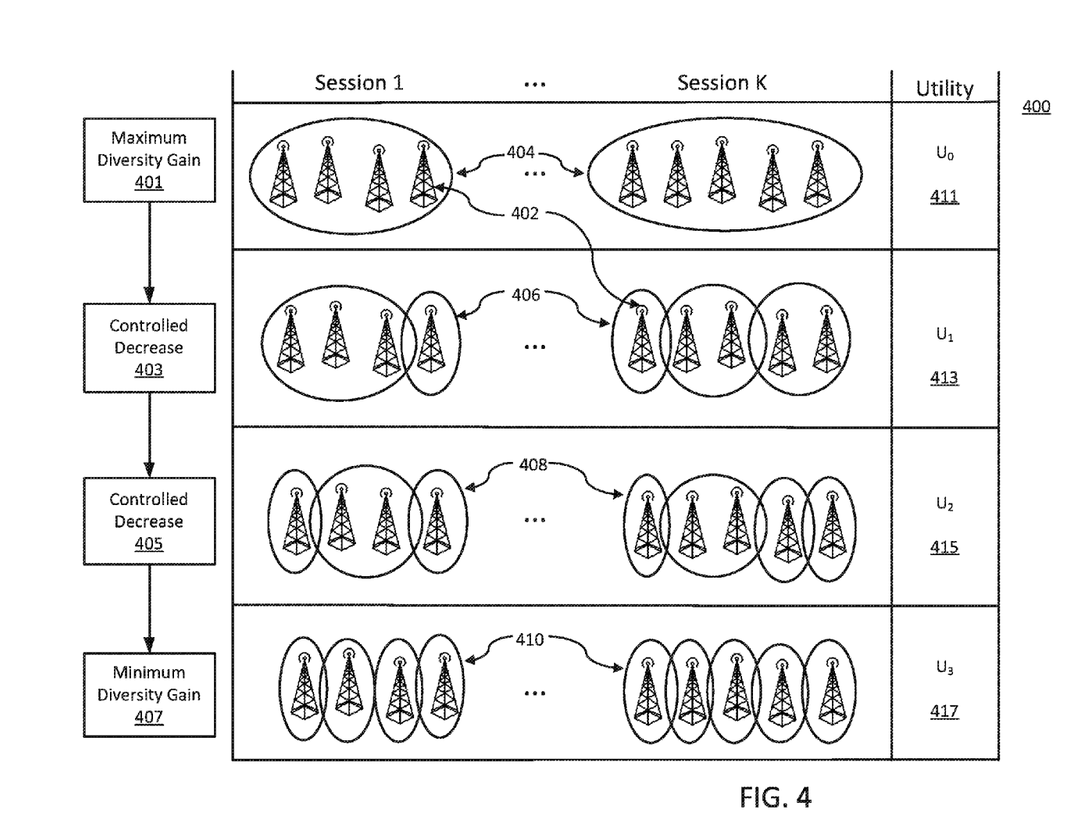
FIG. 4 is a diagram illustratively depicting a system/method for determining maximum utility for data flows, in accordance with one embodiment of the present principles.

Referring now to FIG. 4, with continued reference to FIG. 3, a diagram illustratively depicting a system/method for determining maximum utility for data flows 400 is shown in accordance with one embodiment of the present principles. In one embodiment, given the hardness of the problem, a lightweight and efficient solution that solves the two inter-dependent sub-problems (e.g., SFN clustering 304 and RB allocation 314) may be executed according to the present principles. For example, for a given broadcast session (e.g., Session 1, Session 2 . . . , Session K), SFN clustering may group a plurality of eNBs 402 into sets of cooperative SFNs (i.e., clusters) 404, 406, 408, and 410. Since each cluster may enforce common RB allocation across its constituent eNBs, it may pose constraints on RB allocation in block 314. Further, SFNs determine the amount of transmit diversity gain, which in turn impacts the MCS of broadcast UEs and thus the per-RB data rate delivered to such UEs (and all others in the SFN due to the common MCS).

In one embodiment, since subscription of UEs varies across broadcast sessions, SFN clusters 404, 406, 408, and 410 may be determined for each session separately, each posing their own constraints and MCSs. Furthermore, RB allocation may efficiently assign RBs to flows (broadcast and unicast) in block 314, thereby revealing the aggregate utility. It is noted that the ability of RB allocation 314 to multiplex different flows (and hence achieve the utility gain that can be obtained from it) depends heavily on the constraints posed by SFNs, which contribute their own gain in terms of transmit diversity according to various embodiments.

In one embodiment, due to this tradeoff between the diversity gain (from large SFNs) and multiplexing gain (from efficiently packing multiple flows enhanced by smaller SFNs), an alternating optimization approach is performed for maximizing aggregate system utility 411, 413, 415, and 417. An initial set of clusters 404 that corresponds to maximizing the diversity gain for each session 401 (i.e., single-large SFN) may be created, and the corresponding utility may be obtained by performing RB allocation in block 314. A controlled decrease in diversity gain may be performed in blocks 403 and 405 by deviating away from the single-large SFN cluster and progressively creating smaller clusters 406, 408, and 410 until a minimum diversity gain is reached in block 407.

In one embodiment, it may then be determined if this can be compensated for by the gains from improved RB multiplexing/utilization according to the present principles, resulting from at least one such SFN cluster yielding a higher common MCS than the single-large SFN. This way, the clusters 404, 406, 408, and 410 may be iteratively refined, and RB allocation may be run in block 314 until the combination with maximum utility is determined. In doing so, the present principles may be employed to avoid going through all feasible SFNs for sessions (e.g., to decrease processing requirements, increase overall system speed and efficiency, etc.).

Figure 5:
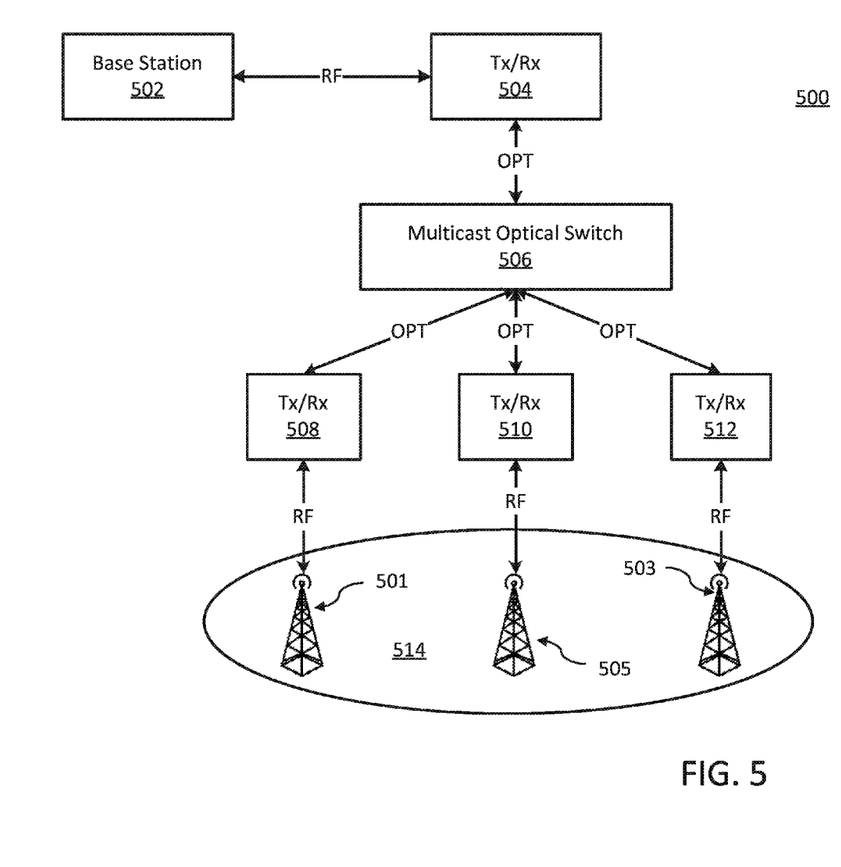
FIG. 5 is a; diagram illustratively depicting a system/method for data transport using an RF-over-Fiber (RFoF) based system, in accordance with one embodiment of the present principles

Referring now to FIG. 5, a diagram illustratively depicting a system/method for data transport using an RF-over-Fiber (RFoF) based system 500 is shown in accordance with one embodiment of the present principles. In various embodiments, the present principles may be applied to a plurality of types of networks and systems. For example, in one embodiment, the present principles may be applied using an RFoF based Cloud-Ran (CRAN) system with Worldwide Interoperability for Microwave Access (Wi-MAX) base stations as RF sources. Although WiMAX and LTE are different standards, they are both based on the same Orthogonal Frequency-Division Multiple Access (OFDMA) technology. The RB allocation in a two-dimensional frame and the impact of SFNs may be similar in both WiMAX and LTE according to various embodiments.

As such, in some embodiments, the present principles may be applied to a WiMAX (or other) system, and relevant characteristics of eMBMS may be evaluated using a WiMAX system 500 (e.g., testbed) according to the present principles. The components of a testbed 500 may include: (i) a server/basestation 502 to stream, for example, broadcast videos using VLC and unicast traffic using iPerf), (ii) three WiMAX base stations 508, 510, 512 used as RF sources, (iii) an optical switch 506 (e.g., multicast optical switch) used to create synchronized SFNs, (iv) three remote radio heads 501, 503, 505 (RRH) or antennas, to transmit RF, and (v) commercial WiMAX UEs (not shown).

In one embodiment, to enable the SFNs the RF output of a base station 502 may be received, and the analog RF signal may be converted into an optical signal in block 504. The optical signal may then be fed into a multicast optical switch 506 that can be programmed and/or controlled remotely. After passing through the switch 506, each optical signal may be converted back to RF in blocks 508, 510, and 512 before being transmitted over-the-air by RRHs heads 501, 503, and 505. When the switch 506 is programmed to replicate one input signal on multiple output ports, each RRH 501, 503, and 505 receives the same optical signal (as shown in FIG. 5). Hence, with the conversion to RF and over-the-air transmission, there are effectively multiple RRHs 501, 503, and 505 transmitting the same RF signal coming from one base station 502 in a synchronized manner as in an SFN.

In one embodiment, by employing the optical switch, very tightly synchronized SFNs may be enabled without the need for an explicit synchronization protocol across RRHs 501, 503, and 505. In some embodiments, to enable single-cell broadcast, we use three base stations as RF sources and program the switch to map each input signal to a distinct output port. This way, each RRH transmits a distinct signal (i.e., interfering with each other) enabling the desired single-cell broadcast effect. Being software programmable, the switch 506 enables the realization of clusters ranging from single-cell broadcast to a single-large SFN and other combinations in between. A controller (e.g., networked computing device), may be employed to customize and coordinate system execution according to various embodiments of the present principles. The controller may be connected to the optical switch (e.g., via RS-232) and may interface with each base station 502 (e.g., over Ethernet). Based on SFN clusters determined/created using the present principles, the controller may be employed to configure the switch 506 accordingly. In addition, the controller may instruct the base station scheduler to apply the RB allocation and MCS parameters determined using various embodiments of the present principles to maximize system performance.

Figure 6:
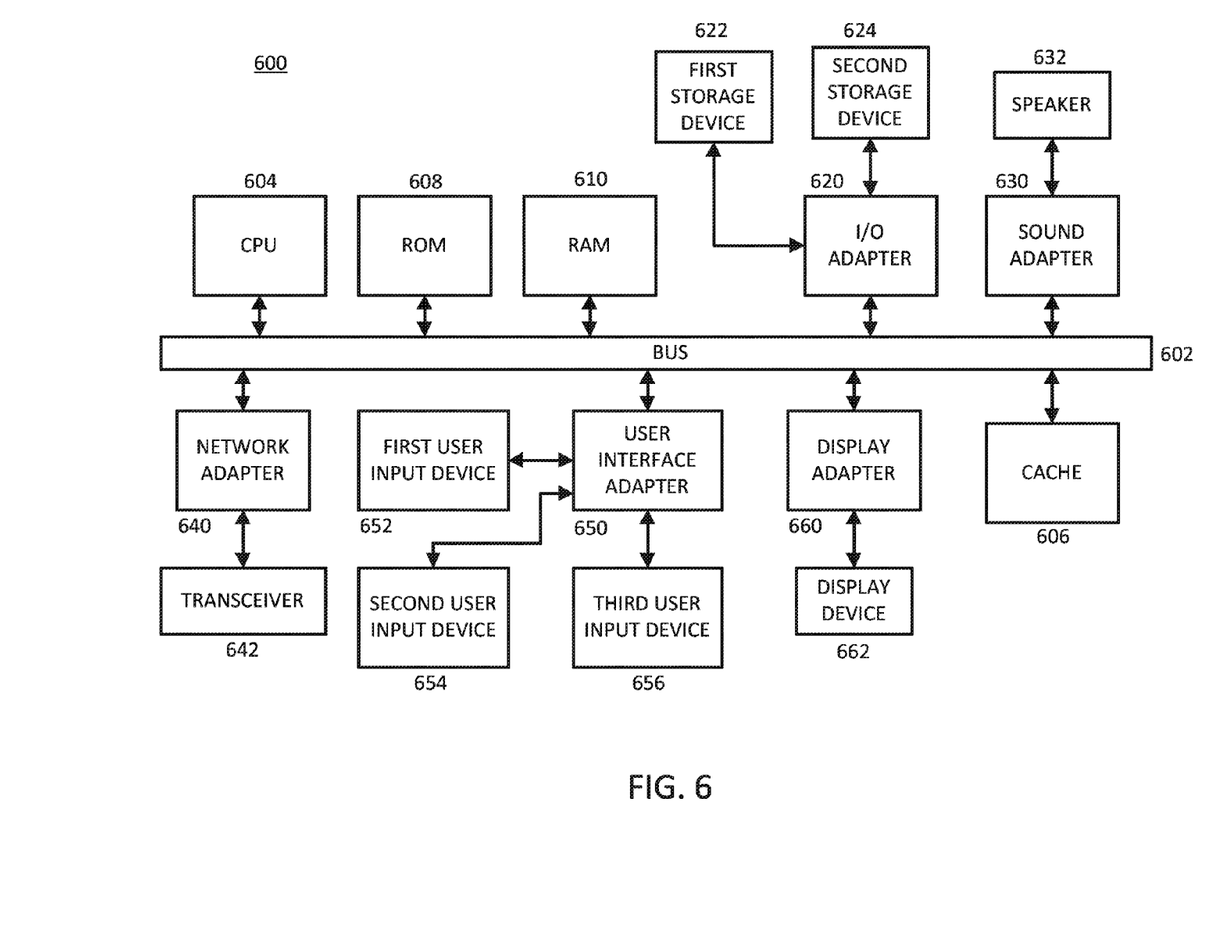
FIG. 6 is a block diagram illustratively depicting an exemplary processing system to which the present principles may be applied, in accordance with one embodiment of the present principles.

Referring now to FIG. 6, an exemplary processing system 600 to which the present principles may be applied is depicted in accordance with an embodiment of the present principles. The processing system 600 includes at least one processor (CPU) 604 operatively coupled to other components via a system bus 602. A cache 606, a Read Only Memory (ROM) 608, a Random Access Memory (RAM) 610, an input/output (I/O) adapter 620, a sound adapter 630, a network adapter 640, a user interface adapter 650, and a display adapter 660, are operatively coupled to the system bus 602.

A first storage device 622 and a second storage device 624 are operatively coupled to system bus 602 by the I/O adapter 620. The storage devices 622 and 624 can be any of a disk storage device (e.g., a magnetic or optical disk storage device), a solid state magnetic device, and so forth. The storage devices 622 and 624 can be the same type of storage device or different types of storage devices.

A speaker 632 is operatively coupled to system bus 602 by the sound adapter 630. A transceiver 642 is operatively coupled to system bus 602 by network adapter 640. A display device 662 is operatively coupled to system bus 602 by display adapter 660.

A first user input device 652, a second user input device 654, and a third user input device 656 are operatively coupled to system bus 602 by user interface adapter 650. The user input devices 652, 654, and 656 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 652, 654, and 656 can be the same type of user input device or different types of user input devices. The user input devices 652, 654, and 656 are used to input and output information to and from system 600.

Of course, the processing system 600 may also include other elements (not shown), as readily contemplated by one of skill in the art, as well as omit certain elements. For example, various other input devices and/or output devices can be included in processing system 600, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 600 are readily contemplated by one of ordinary skill in the art given the teachings of the present principles provided herein.

Figure 7:
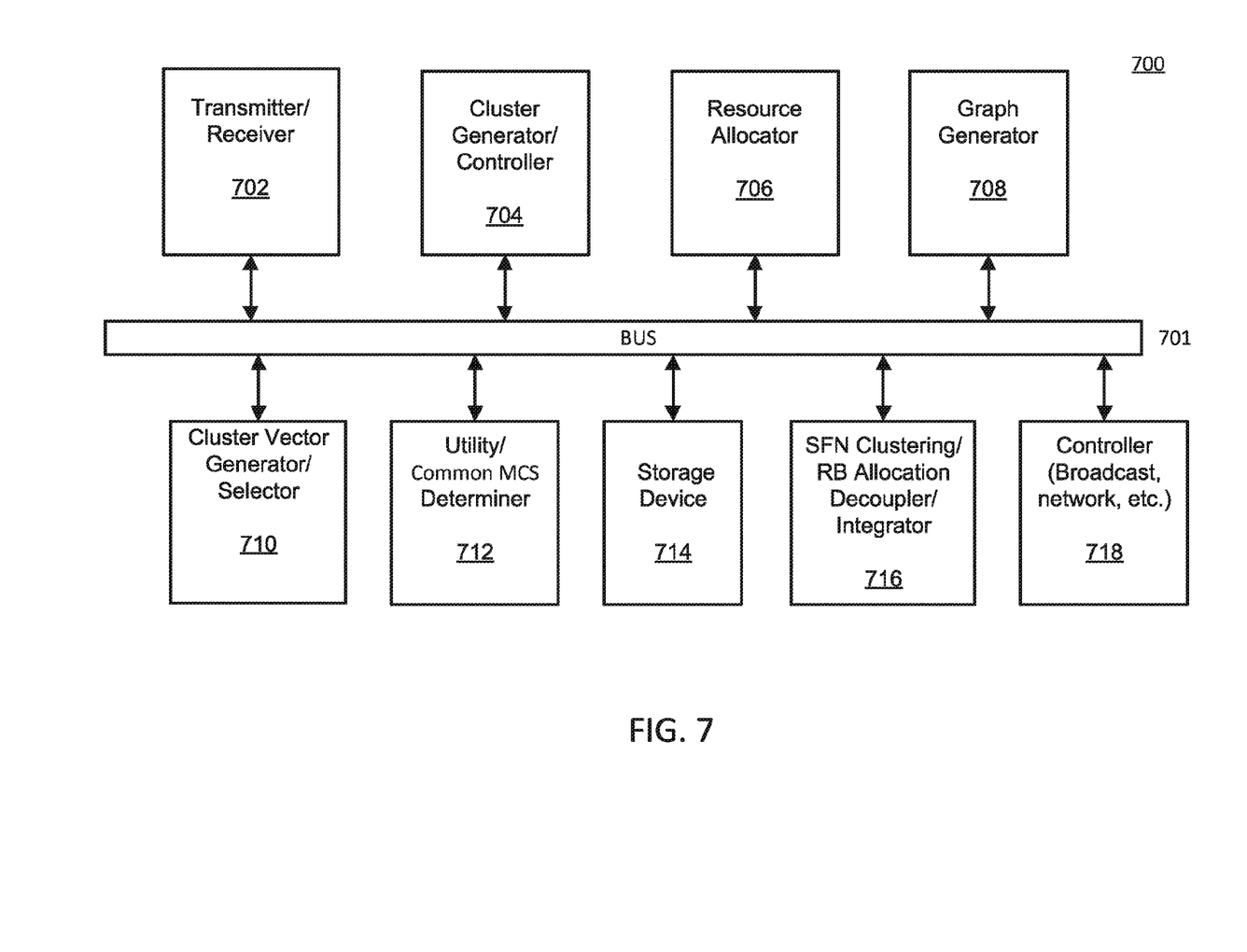
FIG. 7 is a block/flow diagram illustratively depicting an exemplary system for maximizing system utility of broadcast and unicast flows for network-wide broadcasting over Long Term Evolution (LTE), in accordance with one embodiment of the present principles.

Moreover, it is to be appreciated that system 700 described below with respect to FIG. 7 is a system for implementing respective embodiments of the present principles. Part or all of processing system 600 may be implemented in one or more of the elements of system 700.

Further, it is to be appreciated that processing system 600 may perform at least part of the method described herein including, for example, at least part of method 300 of FIG. 3. Similarly, part or all of system 700 may be used to perform at least part of method 300 of FIG. 3.

Referring now to FIG. 7, with continued reference to FIG. 3, an exemplary system 700 for maximizing system utility of broadcast flows for network-wide broadcasting over Long Term Evolution (LTE) is illustratively depicted in accordance with an embodiment of the present principles. While many aspects of system 700 are described in singular form for the sakes of illustration and clarity, the same can be applied to multiples ones of the items mentioned with respect to the description of system 700. For example, while a single, transmitter/receiver 702 may be mentioned with respect to the system 700, more than one transmitter/receiver 702 can be employed in accordance with the teachings of the present principles, while maintaining the spirit of the present principles. Moreover, it is appreciated that the transmitter/receiver 702 is but one aspect involved with system 700 than can be extended to plural form while maintaining the spirit of the present principles.

In one embodiment, the system 700 may include a plurality of modules, which may include one or more transmitters/receivers 702, cluster generators/controllers 704, Resource (RB) allocators 706, graph generators 708, cluster vector generators/selectors 710, determiners 712 (e.g., utility determiners, Min./Max. common MCS determiners), storage devices 714, SFN clustering/RB allocation integrators 716, and/or controllers 718 (e.g., broadcast, network, flow, etc.).

In some embodiments, the transmitter/receiver 702 may be employed at a plurality of base stations to coordinate broadcasting using eMBMS according to the present principles. A cluster generator/controller may be employed to, for example, generate, track and control clusters, and may iteratively create clusters until a threshold is met, etc. as described above with respect to blocks 304, 306, 308, 310, and 312 of FIG. 3. A resource allocator 706 may be employed to allocate resources to flows, determine marginal utility, common MCS for SFNs, etc. as described above with respect to blocks 314, 316, 318, 320, 322, and 324 of FIG. 3. A graph generator 708 may generate directed and undirected graphs, as described above with respect to block 306 of FIG. 3.

In one embodiment, a cluster vector generator/selector 710 may be employed for determining and storing clustering solutions from the generated vectors, as described above with respect to block 312 of FIG. 3. A determiner 712 (e.g., utility determiner, minimum/maximum common MCS determiner 712 may be employed, as described above with respect to blocks 318 and 320 of FIG. 3. A storage device 714 (e.g., non-transitory computer readable storage medium) may be employed to store data, instructions, etc. according to various embodiments of the present principles. An SFN clustering/RB allocation decoupler and/or integrator 716 may be employed for decoupling/integrating SFN clustering and RB allocation according to the present principles, as described above with respect to blocks 326 and 332 of FIG. 3. In various embodiments, a controller 718 may be employed to control a plurality of functions of the system and method according to the present principles, including, for example, broadcast flow control based on the determined maximum system utility, network/switch control, base station coordination/synchronization control, etc.

In some embodiments, the system 700 may be an efficient multi-cell broadcasting framework that leverages the notion of single frequency network, for eMBMS operations in LTE according to the present principles. The system 700 may efficiently allocate radio resource blocks across LTE eNBs to serve multiple broadcast sessions and unicast traffic. In some embodiments, at least two important factors may be present in the system, including (i) Transmit diversity gain, which leverages cooperation among eNBs to improve SINR, and (ii) Resource multiplexing gain, which leverages channel diversity among eNBs according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for network-wide broadcasting, comprising:
identifying interference dependencies between base stations (eNBs) to generate one or more single frequency network (SFN) clusters for one or more broadcast sessions, the generating SFN clusters comprising:
performing a controlled decrease in transmit diversity gain for each of the sessions by progressively creating smaller SFN clusters;
iteratively creating the smaller SFN clusters until a target modulation and coding scheme (MCS) threshold is met to generate a plurality of SFN clusters; and
selecting an SFN cluster with a maximum common MCS for all SFN clusters in a set;
integrating resource block (RB) allocation with the generating of the SFN clusters to determine maximum system utility, wherein the system utility considers the sum of the utilities of broadcast and unicast flows; and
controlling network-wide broadcasting based on the determined maximum system utility.

2. The method as recited in claim 1, wherein the integrating includes iteratively allocating one resource block (RB) to each flow until a threshold condition is met.

3. The method as recited in claim 1, wherein the target MCS threshold is reached when each of the eNBs operates in isolation.

4. The method as recited in claim 1, wherein the resource block (RB) allocation further comprises determining an SFN with a minimum common MCS for any SFN in a set, and allocating one RB from all eNBs in the set to the SFN with the minimum MCS until a threshold is met.

5. The method as recited in claim 1, further comprising constructing a graph where edge weights capture the transmit diversity gain between each pair of eNBs and vertex weights capture the Signal to Interference-plus-Noise Ratio (SINR) margin that an eNB has for supporting the target MCS.

6. The method as recited in claim 5, wherein the maximum system utility is achieved by controlling a tradeoff between transmit diversity gain and resource multiplexing gain.

7. The method as recited in claim 1, wherein the resource block (RB) allocation further comprises determining a flow that yields a maximum marginal utility, and allocates a next RB to the flow.

8. A non-transitory computer readable storage medium comprising a computer readable program for network-wide broadcasting, wherein the computer readable program when executed on a computer causes the computer to perform the steps of:
identifying interference dependencies between base stations (eNBs) to generate one or more single frequency network (SFN) clusters for one or more broadcast sessions, the generating SFN clusters comprising:
performing a controlled decrease in transmit diversity gain for each of the sessions by progressively creating smaller SFN clusters;
iteratively creating the smaller SFN clusters until a target modulation and coding scheme (MCS) threshold is met to generate a plurality of SFN clusters; and
selecting an SFN cluster with a maximum common MCS for all SFN clusters in a set;
integrating resource block (RB) allocation with the generating of the SFN clusters to determine maximum system utility, wherein the system utility considers the sum of the utilities of broadcast and unicast flows; and
controlling network-wide broadcasting based on the determined maximum system utility.

9. The non-transitory computer readable storage medium as recited in claim 8, wherein the integrating includes iteratively allocating one resource block (RB) to each flow until a threshold condition is met.

10. The non-transitory computer readable storage medium as recited in claim 8, wherein the target MCS threshold is reached when each of the eNBs operates in isolation.

11. The non-transitory computer readable storage medium as recited in claim 8, wherein the resource block (RB) allocation further comprises determining an SFN with a minimum common MCS for any SFN in a set, and allocating one RB from all eNBs in the set to the SFN with the minimum MCS until a threshold is met.

12. The non-transitory computer readable storage medium as recited in claim 8, further comprising constructing a graph where edge weights capture the transmit diversity gain between each pair of eNBs and vertex weights capture the Signal to Interference-plus-Noise Ratio (SINR) margin that an eNB has for supporting the target MCS.

13. The non-transitory computer readable storage medium as recited in claim 8, wherein the resource block (RB) allocation further comprises determining a flow that yields a maximum marginal utility, and allocates a next RB to the flow.

* * * * *